Sept. 16, 1941.   R. STUART   2,256,178

FILM READING SYSTEM

Filed Feb. 4, 1939   2 Sheets-Sheet 1

INVENTOR.
Robert Stuart,
BY
ATTORNEY.

Sept. 16, 1941.  R. STUART  2,256,178
FILM READING SYSTEM
Filed Feb. 4, 1939  2 Sheets-Sheet 2
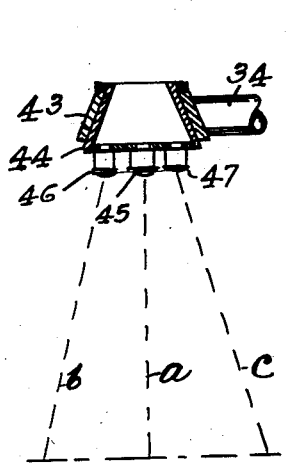
Fig. 4
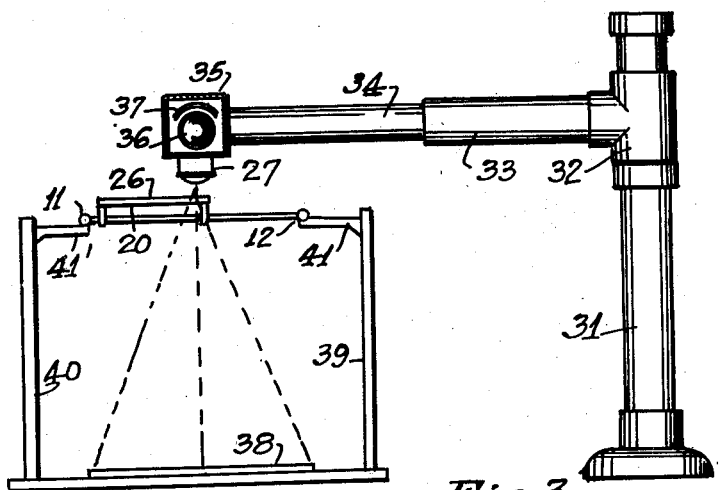
Fig. 3
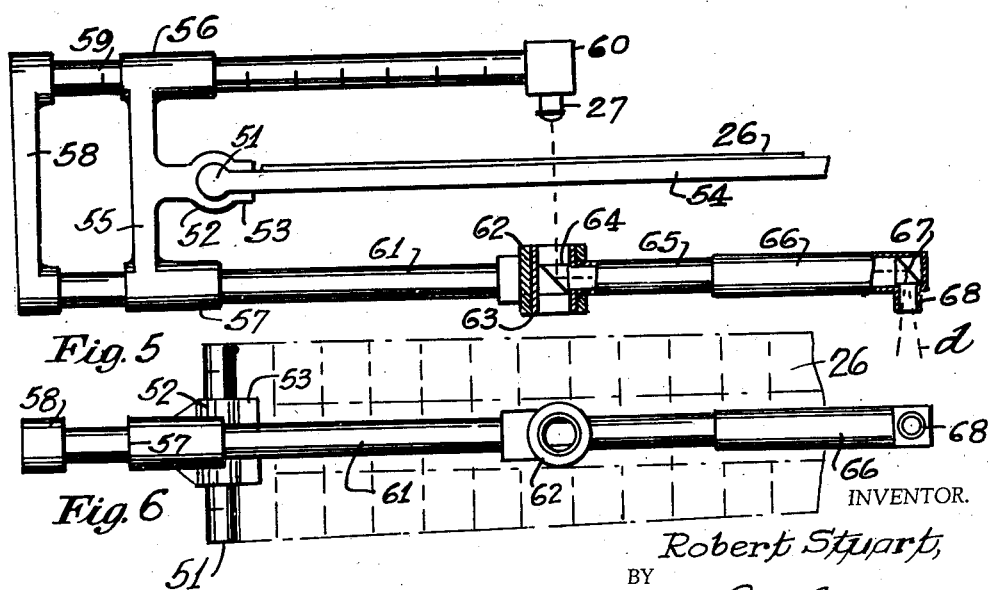
Fig. 5
Fig. 6
INVENTOR.
Robert Stuart,
BY
M. H. Laughridge
ATTORNEY.

Patented Sept. 16, 1941

2,256,178

UNITED STATES PATENT OFFICE 2,256,178

FILM READING SYSTEM

Robert Stuart, Forest Hills, N. Y.

Application February 4, 1939, Serial No. 254,694

6 Claims. (Cl. 88—24)

This invention relates to a system for selectively making the microfilm subjects accessible for reading purposes. The film may, preferably, be mounted on a sheet carrier, either in individual squares or in a continuous band having several frames, which is flat and is readily filed away. The sheet carrier may be made from transparent stock or it may be provided with openings that register with the picture subjects on the film so that these subjects may be projected without removing the film from the carrier. Any support that holds the film straight in front of the projector will perform the function of the carrier. An object of the invention is to provide rotating means for projecting more than one frame of the film at a time. Another object of the invention is to provide a projecting system adjustable relative to the film with optical means for projecting the picture or subject in any predetermined position.

Other objects of the invention will be more particularly understood from the following specification and the accompanying drawings, in which:

Fig. 3 is an elevation showing a projecting apparatus and its relation to a film carrier and the projected subject;

Fig. 4 shows in section one form of head for the projecting apparatus by which a plurality of squares may be projected in different locations at the same time.

Fig. 5 is an elevation of a projecting apparatus adjustably mounted on the supporting frame of the carrier and having a swinging head to locate the position of the projected subject and, Fig. 6 is a plan view from below of the apparatus shown in Fig. 5.

Figures 1, 2:
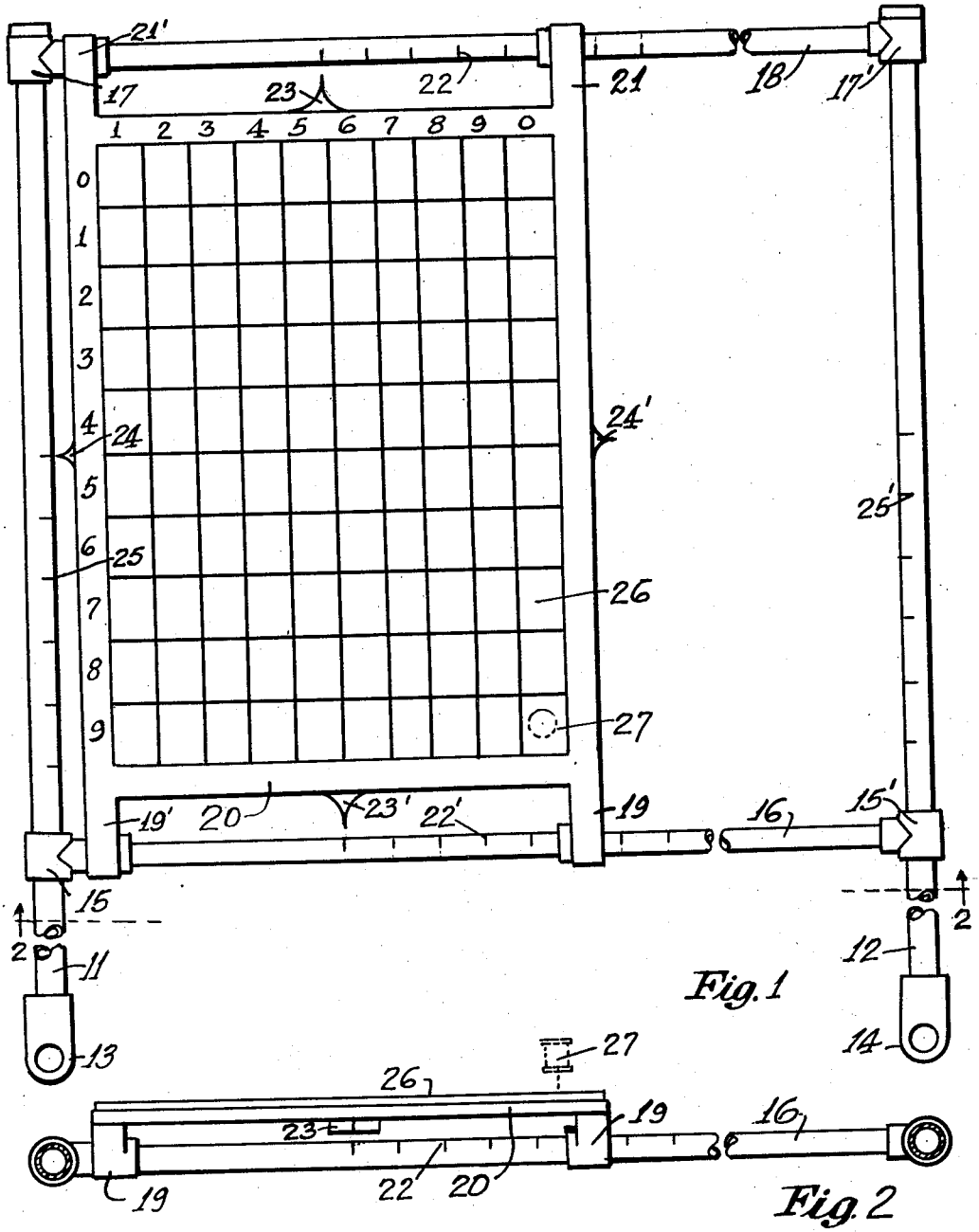
Fig. 1 is a plan view of the supporting frame and the film carrier.
Fig. 2 is an elevation on line 2—2 of Fig. 1.

Microfilm is coming into general use and is extensively used for keeping records of documents, papers and for reproducing books.

The film is supported by a carrier which is mounted on a supporting frame below a projecting lens in a fixed position with relation to the frame. This frame is slidable in two directions at right angles to each other, below the projector and by the use of an index system for each direction of adjustment any frame can be quickly brought into the field of the projector and the subject read.

It is sometimes necessary to project the subject of more than one frame or one square at a time. For this purpose the projector may be provided with a rotating head, having one or more lenses off-centered from the center of rotation, so that while the central subject is continuously projected, any one of the surrounding subjects may also be projected adjacent to the central subject by rotating the head to bring the lens into register with the required frame.

In addition to adjusting the supporting frame with relation to the projecting system, the invention also contemplates the adjustment of the projecting system relative to a fixed frame so that the projector may be brought into register with any frame desired and, by an optical system, the picture subject may be transferred to any convenient location desired for projecting purposes. This is very useful for instance when one frame contains an illustration and other frames contain the description of the illustration, both of which should be available to the observer at the same time.

In the drawings 11 and 12 are horizontal members of a pipe frame which may be secured by the terminals 13 and 14. The cross frame 16, through the eyes 15, 15' is mounted on the pipes 11 and 12, and the cross frame 18, through the eyes 17, 17' is also mounted on the pipes 11 and 12. Through the arms 19, 19', slidably mounted on pipe 16, and the arms 21, 21', slidably mounted on 18, the frame 20 is adjustably supported by the pipes 11 and 12. This frame is divided into squares as indicated at 26, corresponding in size with the film frames or squares and it may be made from transparent stock or it may be made from opaque stock with suitable apertures therein for each square. The squares are numbered at the top in ten rows running from 1 to 0 and they are numbered on the side in ten rows running from 0 to 9.

An index pointer is provided at 23 which registers with the index marks 22, corresponding with the vertical divisions of the squares, a similar index 23' and marks 22' are provided at the opposite end, and another index pointer 24 is provided at the side, registering with the index marks 25 on pipe 11 and a similar index 24' registers with marks 25' on pipe 12. The location of the fixed projector relative to the frame is indicated at 27. It will be noted that the frame can be slid transversely of the pipes 16 and 18 to bring any transverse row of the squares into registry with the projector 27 and it can also be slid on pipes 11 and 12 at right angles to 16 and 18 to bring any one of the vertical rows of squares, as indicated in Fig. 1, under the projector 27. The particular square desired is readily selected by the index numbers at the top and at the side of the frame.

The stand 31, Fig. 3 has a rotating head 32 carrying the tubular arm 33 in which the arm 34 telescopes. The arm 34 is provided with a head 35, having a light 36, a reflector 37 and the projecting lens 27, which is placed over the squares 26 in the frame 20, which is supported by brackets 41—41', secured to the walls 39 and 40 of the enclosure for the reflecting screen 38 upon which the image of the subject is projected by 27. The walls 39 and 40 shield the subject from extraneous light. When not in use the arm 33 can be swung to the side.

In Fig. 4 the arm 34 is provided with an annular head 43 in which the lens carrier 44 is rotatably mounted and this head is provided with a source of illumination corresponding to 36. The carrier 44 rotates parallel with screen 38 so that in each position the subject is focused on the screen. The central lens 45 projects a central image as indicated by $a$, the lens 46 projects an image as indicated by $b$, adjacent to the image produced by $a$, and the lens 47 produces another image corresponding to $c$. The lenses 46 and 47 are spaced from the lens 45 and are substantially parallel thereto, so as to register with the adjoining squares and by rotating the head 44 the subject of any adjoining square can be projected adjacent to the central image.

In Fig. 5 the frame 54 is provided with squares at 26 through which the subject is projected and it is provided with a rounded edge at 51 which is engaged by the jaw 52 of the sliding head 55 and is held parallel with the frame 54 by the extension of the jaw 52 at 53. The head 55 is provided with a socket 56 above the frame 54 and with a second socket 57 below the frame 54. The arms 59 and 61 are connected by the cross head 58; 59 slides in socket 56 and 61 slides in socket 57 together as controlled by the cross head 58 and the extent to which they are moved can readily be determined by the index marks on 59.

Arm 59 is provided with a head 60, carrying the projecting lens 27 and arm 61 is provided with a socket 62 enclosing the hollow trunnion 63 to which the tubular arm 65 is connected and pivots on the socket 62. The arm 66 is telescopically mounted on the arm 65 and is connected by the prism 67 and the prism 64 with the projector 27 to project the subject as indicated at $d$ from the head 68.

In this arrangement it will be noted that the projecting apparatus slides on 51 until the particular horizontal row is located, then the cross head 58 is adjusted transversely until the projector 27 registers with the particular square desired. This projects the picture subject on the prism 64 and its final location is determined by the telescopic adjustment of the arm 66 and its rotary adjustment in the socket 62 so that the projected picture may be located in any desired position. This apparatus can be applied to the apparatus shown in Figs. 1, 2 and 3, without interfering with the operation of the latter. This enables an illustration, for instance, to be projected from any of the squares and placed beside a projection of reading matter relating to the same illustration. It should be understood that the optical system is shown only in diagrammatic form to illustrate the operation of the system.

The optical arrangement for projecting the subject of the film frames may be applied with any apparatus that will support the film in position suitable for projection.

The carrier for the film may be any convenient support that will hold the film in position below the projector and expose the subject to be projected.

Having thus described my invention, I claim:

1. A system for reading microfilm, comprising a carrier having transparent squares, means for securing the film to said carrier with one frame of the film in register with each square, a supporting frame for said carrier, a sliding head secured to said frame, a crosshead, an arm carrying a projector above said carrier, and a second arm carrying a prism for deflecting the line of projection below said carrier in optical register with said projector, said arms rigidly connected to move together by said crosshead slidably supported by said sliding head to adjust the projector to register with any frame and means for projecting the subject of the frame through said prism.

2. A system for reading microfilm, comprising a carrier having transparent squares, means for securing the film to said carrier with one frame of the film in register with each square, a supporting frame for said carrier, a sliding head secured to said frame, a crosshead, an arm slidably secured to said sliding head located above said carrier and supporting a projector, a second arm slidably secured to said sliding head located below said carrier, said arms being rigidly connected to move together by said crosshead, a prism for deflecting the line of projection rotatably mounted on said second arm in optical register with said projector and means for projecting the subject of said frame through said prism.

3. A system for reading microfilm, comprising a carrier having transparent squares, means for securing the film to said carrier with one frame of the film in register with each square, a supporting frame for said carrier, a sliding head secured to said frame, an arm slidably secured to said head located above said carrier and supporting a projector, a second arm slidably secured to said head located below said carrier, a prism rotatably mounted in said second arm in optical register with said projector, a telescopic tube connected with and rotatable with said prism and a second prism at the end of said telescopic tube for projecting the subject of the frame upon a screen.

4. A system for reading microfilm, comprising a carrier having transparent squares, means for securing the film to said carrier with one frame of the film in register with each square, a supporting frame for said carrier, a sliding head secured to said frame, an arm slidably secured to said head located above said carrier and supporting a projector, a second arm slidably secured to said head located below said carrier, a third arm pivoted to said second arm on the optical axis of said projector and an optical system including a pair of prisms for projecting the subject of the frame at the end of the third arm.

5. A system for scanning microfilm and projecting the pictures, selectively and individually on a screen comprising a film upon which the pictures are arranged in squares, a first projector having a head, means for adjusting the film relative to said head to project the selected square of the film on said screen which remains fixed, and a second projector, means pivotally mounting said second projector on said head to rotate about the optical axis of and parallel with the first projector and being arranged to project an adjacent square of the film on said screen adjacent to the selected square and to change from one square to another as said projector is rotated.

6. A system for reading microfilm comprising a film upon which the pictures are arranged in squares, a support for said film, a sliding head secured to said support, a crosshead having an arm carrying a projector above said film and a second arm carrying a prism for deflecting the line of projection below said film in optical register with said projector, said arms being rigidly connected by said crosshead to adjust the projector to register with any square of the film and means for projecting the subject of the square through the prism.

ROBERT STUART.